United States Patent [19]

Beauford

[11] Patent Number: 5,464,504
[45] Date of Patent: Nov. 7, 1995

[54] INFERENTIAL CORRECTION OF COMPOSITION FOR A DISTILLATION ANALYZER

[75] Inventor: Martin H. Beauford, Borger, Tex.

[73] Assignee: Phillips Petroleum Company, Bartlesville, Okla.

[21] Appl. No.: 160,312

[22] Filed: Dec. 2, 1993

[51] Int. Cl.⁶ ..................................................... B01D 3/42
[52] U.S. Cl. ............. 203/3; 203/1; 203/2; 203/DIG. 18; 202/160; 364/501
[58] Field of Search ........................... 203/1–3, DIG. 18, 203/94, 98; 202/160; 364/500–502; 422/82.12, 101, 119; 327/91, 307; 73/23.36, 23.41

[56] References Cited

U.S. PATENT DOCUMENTS

| | | | |
|---|---|---|---|
| 3,156,628 | 11/1964 | Larrison | 203/3 |
| 3,259,554 | 7/1966 | Constantikes | 203/3 |
| 3,269,922 | 8/1966 | Price et al. | 203/3 |
| 3,272,722 | 9/1966 | Walker | 203/3 |
| 3,282,799 | 11/1966 | MacMullan | 203/3 |
| 3,428,528 | 2/1969 | Oglesby, Jr. et al. | 202/160 |
| 3,449,215 | 6/1969 | Johnson et al. | 202/160 |
| 3,714,591 | 1/1973 | Allington | 327/307 |
| 3,985,623 | 10/1976 | Morgan et al. | 203/DIG. 18 |
| 4,344,142 | 10/1982 | Diehr et al. | 364/473 |
| 4,526,657 | 7/1985 | Hobbs et al. | 203/3 |
| 4,676,870 | 6/1987 | Stewart et al. | 364/501 |
| 5,132,918 | 7/1992 | Funk | 203/2 |
| 5,260,865 | 11/1993 | Beauford et al. | 203/DIG. 18 |

OTHER PUBLICATIONS

Liptak, B. G., Process Control Handbook, pp. 843–844.

*Primary Examiner*—Virginia Manoharan
*Attorney, Agent, or Firm*—George E. Bogatie

[57] ABSTRACT

In a distillation column, which for control purposes cannot tolerate the inherent dead time between analysis of consecutive samples in chromatograph analyzers, the chromatograph output is frequently corrected by inferring a dynamic correction based on the temperature change of a selected tray in the column. The dynamic correction applied to the distillation analyzer essentially eliminates the inherent dead time for obtaining a chromatograph analysis, and accordingly increased the rapidity of response of the column controls which rely on chromatograph analysis.

15 Claims, 2 Drawing Sheets

INFERENTIAL CORRECTION OF COMPOSITION FOR A DISTILLATION ANALYZER

This invention relates to gas chromatograph analyzers used for composition control of a distillation column. In one aspect it relates to method and apparatus for inferential correction of an analysis from a distillation analyzer that periodically provides an analysis and retains the last analysis value until a following analysis is completed. More specifically, it relates to applying a correction for updating the last value of a component concentration analysis provided by an on-line distillation analyzer which essentially removes the effect of analyzer delay as well as handling interpolation between sample analyses.

BACKGROUND OF THE INVENTION

The gas chromatograph is perhaps the most useful analytical tool available today to the chemical process engineer. The gas chromatograph takes a fixed volume of sample gas, or liquid which can be vaporized, and introduces a fixed volume of sample gas into a separating column which contains a stationary phase of adsorbent material. The sample is transported through the separating column using a mobile phase carrier, and the individual molecules of the sample gas are adsorbed and then released at different times from the adsorbent stationary phase material in the column.

When the adsorbent material in the separating column and the operating parameters are properly selected, the separated components of the sample elute or emerge from the column completely separated in time from each other and from any other components that may be present. This eluting stream is passed through a detector and the relative response of the detector is sensed by an electronic unit and converted to a digital signal. The digital signal is a specific number that represents the concentration of a component in the sample which is true for one specific sample analysis. This number is generally stored in a memory register until updated.

If the sample update rate is high enough for a varying composition to change only slightly between each sample, the digital signal can quite accurately represent the composition vs. time behavior of the sampled quantity. The maximum sampling rate, however, is limited by the response speed of the sampling system and time required to analyze the sample. For a distillation column there can be a significant delay due to transportation of the sample to the analyzer plus the analysis time. For example, it may take two minutes for the sample to arrive at the analyzer another four minutes for obtaining the analysis, which results in a total delay of six minutes. Total delay times for distillation columns typically range from about three minutes to about thirty minutes.

To reconvert the digital signal obtained from periodic analysis of consecutive samples to a continuous or analog form for use in automatic process control, a zero order for a sample and hold circuit is usually sufficient. The zero order hold merely retains the value of the digital signal until the next sample changes it, therefor creating a dead time between analysis. Sample and hold techniques, however, result in poor control for fast responding distillation columns such as depropanizers, so that if composition control is desired on these fast changing columns, an analyzer controller must purposely be detuned for the column to remain stable.

Accordingly, it is an object of this invention to provide an accurate and essentially continuous composition analysis signal from a chromatograph analyzer which is suitable for use in controlling a fast responding distillation column.

It is further object of this invention to provide a dynamic inferential correction for the latest analysis provided by a distillation analyzer.

It is a still further object of this invention to infer concentration of a key component of a distillate product from a temperature measurement.

It is a still further object of this invention to determine the best point to locate a temperature sensor in a distillation column for inferring composition of a distillate product from a temperature measurement.

BRIEF SUMMARY OF THE INVENTION

In accordance with this invention there is provided method and apparatus for applying a dynamic correction to the output of an analyzer of the type that provides an analysis signal that is true for a completed analysis and then retains that value for a time interval between samples until a following sample is analyzed.

The dynamic correction requires determination of a temperature difference on a selected tray in a distillation column from the time the analyzer completes an analysis until a selected time, which may coincide with the completion of the following analysis or may be a selected time between consecutive analysis. A temperature signal from the selected tray, which is delayed in time to match the total delay of the analyzer, is employed in determining the temperature difference. The delayed temperature signal is sampled when an analysis is completed and the sampled temperature value is held during the next analysis. The current tray temperature and the value of the delayed temperature corresponding to the completion of the analysis are used in the following exponential equation to calculate the correction:

$$\Delta X = X(e^{b\Delta T} - 1) \qquad \text{Eq.(1)}$$

where:

X is the latest chromatograph analyzer output, in mole fraction.

$\Delta X$ is the correction to be applied to X, $\Delta T = T - T_d$

T is the current temperature of the liquid on the selected tray, in absolute units, $T_d$ is the delayed temperature at the completion of an analysis, in absolute units, and b is a constant dependent upon the separation carried out.

In a preferred embodiment, the location of a distillation column tray for providing the temperature measurement is selected with the aid of a steady state off-line computer simulation of the distillation column where the simulation provides a temperature profile for the column corresponding to a change in product flow so as to indicate maximum temperature sensitivity to product flow.

An on-line computer determines the correction and updates the distillation analysis value between sample periods either on a periodic basis or when requested by a program that controls operation of the distillation column. The dynamic correction applied to the distillation analyzer for updating the last analysis essentially eliminates the dead time associated with the analysis and accordingly increases the rapidity of response of the distillation column control system.

Other objects and advantages of the invention will be apparent from the foregoing brief description of the invention and the claims as well as the detailed description of the drawings which are briefly described as follows.

DETAILED DESCRIPTION OF THE INVENTION

For a better understanding of the invention, the derivation of the equation for calculating the dynamic correction for updating the chromatograph analyzer output signal is presented below.

One may presume a temperature-composition model for the key component at a tray in the distillation column as an exponential curve for composition vs. temperature, such as:

$$\ln(X)=bT, \text{ or } X=e^{bT} \qquad \text{Eq.}(2)$$

Where the variables and constants are defined in equation (1).

The distillation column internal stream correction is then $$\Delta X = X_c - X \qquad \text{Eq.}(3)$$

Where: $X_c$ is the inferentially updated value for the concentration of a key component.

substituting: $X=e^{bT}d$ and $X_c=e^{bT}$ in equation (3), one obtains equation (1).

Figure 2:
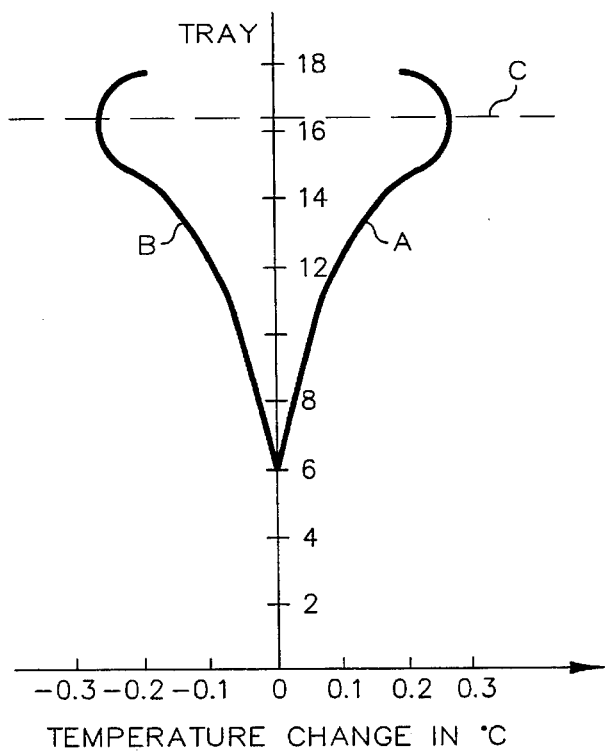
FIG. 2 is a plot showing column temperature profile changes for a varying distillate flow.

The best way to locate the temperature sensor used for updating the chromatograph analysis cannot be established from generalizations. The important consideration is to measure the temperature on a tray that most reflects changes in composition. This can be determined from a steady state simulation of the distillation column using an off-line computer to determine a tray which yields temperature changes essentially such as illustrated in FIG. 2, where the "A" section of the curve is obtained by stimulating a 1% increase in distillate flow and the "B" section is for a 1% decrease in distillate flow and the dash line "C" indicates a tray for maximum temperature sensitivity, which is preferred for location of the sensor in this invention.

The invention is illustrated and described in terms of using the inferentially updated chromatograph analysis for improved overhead composition control for a distillation column. The invention, however, extends to improved computer control for other distillate product streams such as a bottoms product. A specific control system configuration showing only those portions of an overall distillation column control necessary to illustrate the present invention is set forth in FIG. 1 for the sake of illustration. A large number of additional control devices would ordinarily be utilized to control a distillation column, those additional devices have not been illustrated for the sake of clarity. These additional control devices would necessarily include distillation pressure control.

Figure 1:
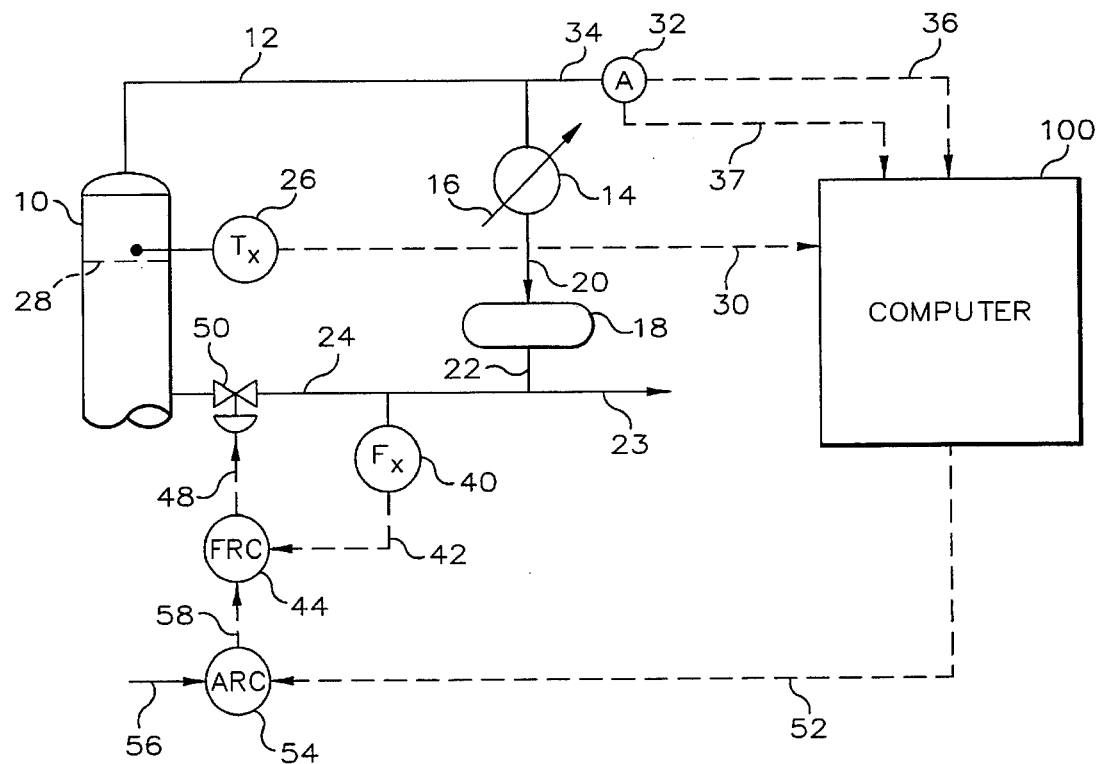
FIG. 1 is a simplified schematic illustration of a distillation column and an associated control system using the updated analysis signal according to this invention for improved column control.

Referring now to FIG. 1 there is illustrated the upper section of a distillation column 10 which separates material according to the difference in a vapor pressure. For the sake of simplicity only the upper portion of the column is illustrated in FIG. 1, the invention, however, can be applied to the upper section or the bottom section or both upper and bottom sections of a distillation column.

An overhead stream is provided from the distillation column 10 through conduit 12 to the heat exchanger 14. The heat exchanger 14 is provided with a cooling medium flowing through the conduit 16. A fluid stream is provided from the heat exchanger 14 to the overhead accumulator 18 through conduit 20 and liquid in the overhead accumulator 18 is withdrawn from the accumulator 18 through conduit 22. This liquid is generally referred to as the overhead liquid product.

A portion of the liquid overhead product is withdrawn through conduit 22 and returned to the distillation column as an external reflux through conduit 24 and the remainder is withdrawn through conduit 23 as product. Temperature transducer 26 in combination with a temperature measuring device such as a thermocouple which is operably located on a selected tray 28 in the upper portion of distillation column 10 provides an output signal 30 which is representative of the temperature of the liquid on the selected tray 28. Signal 30 is provided from temperature transducer 26 as an input signal to computer 100.

A chromatograph analyzer 32 withdraws a sample of the overhead product from conduit 12 via conduit 34, and after an inherent delay determines the mole fraction concentration of at least one key component in the sample, and provides the analysis to the computer 100 via signal line 36. The sample withdrawn by analyzer 32 could be a liquid sample or a vapor sample, however, a liquid sample is preferred because of difficulty in keeping vapor in the vapor state in transporting the sample to the analyzer 32. Analyzer 32 also provides an analysis completion signal 37 to the computer 100.

In response to the above described inputs computer 100 calculates a correction for updating the distillation analyzer signal 36 as will be described more fully hereinafter, and provides the updated analysis signal 52 as a process variable input to the analyzer recorder controller 54. The analyzer recorder controller 54 is also provided with a setpoint signal 56 which is representative of the desired concentration of the key component in the overhead stream withdrawn from distillation column 10 via conduit 12. In response to signals 52 and 56 analyzer recorder controller 54 provides an output signal 58 which is responsive to the difference between signals 52 and 56. Signal 58 is scaled to be representative of the flow rate of external reflux flowing in conduit 24 required to maintain the actual concentration of the key component in the overhead distillate product substantially equal to the desired concentration represented by signal 56. Signal 58 is provided from analyzer recorder controller 54 as a setpoint signal to flow rate controller 44.

Flow transducer 40 in combination with a flow sensor operably located in conduit 24 provides an output signal 42 which is representative of the actual flow rate of fluid flowing through conduit 24. Signal 42 is provided from flow transducer 40 as the process variable input to flow controller 44. In response to signals 42 and 58 flow controller 44 provides an output signal 48 which is responsive to the difference between signals 42 and 58. Signal 48 is scaled to be representative of the position of control valve 50, which is operably located in conduit 24, required to maintain the actual flow rate of fluid through conduit 24 substantially equal to the desired flow rate represented by signal 58.

Figure 3:
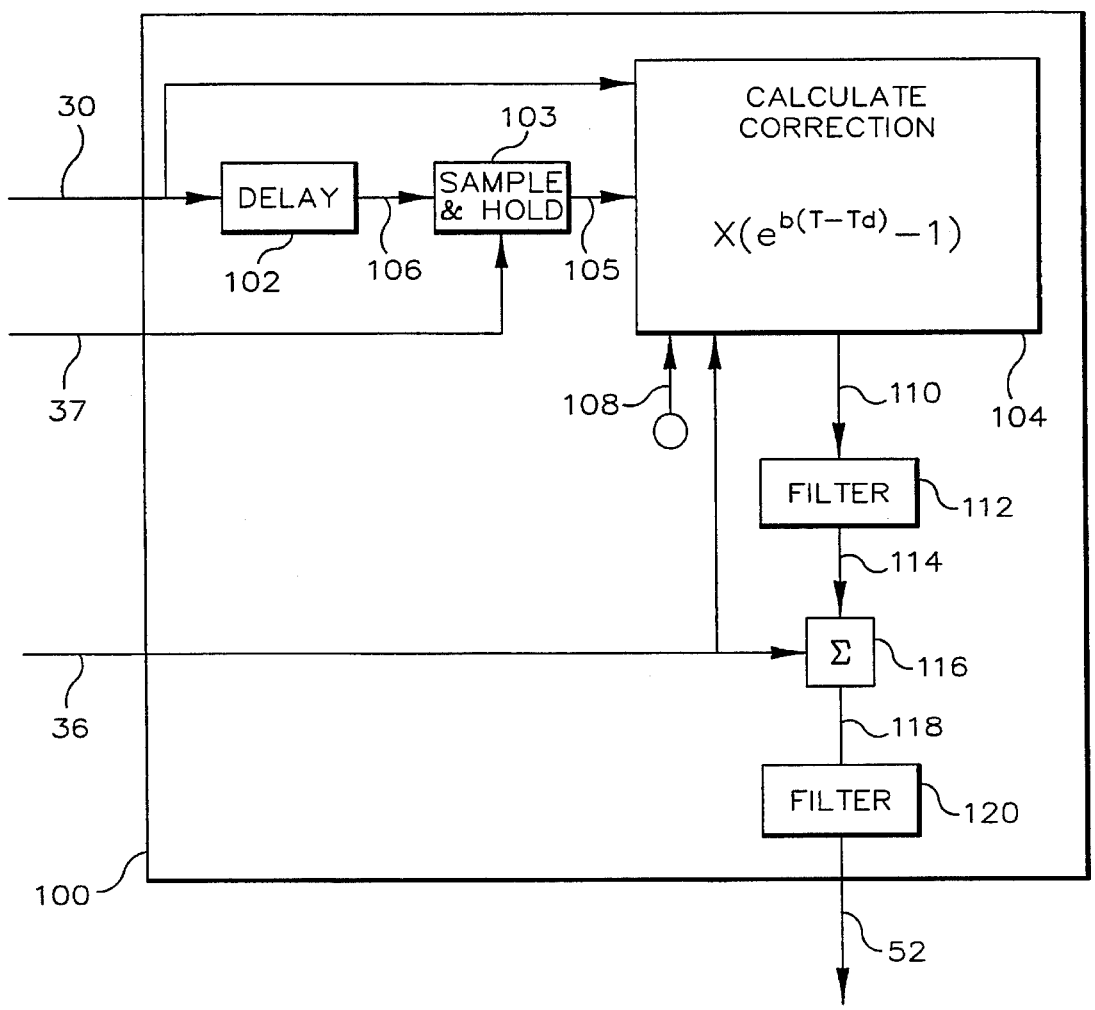
FIG. 3 is a block diagram of computer logic illustrating how the process measurements of FIG. 1 are utilized to derive the updated analysis signal for the analyzer controller illustrated in FIG. 1.

Referring now to FIG. 3 there is illustrated in block diagram form the computer logic utilized to calculate the process variable signal 52 in response to the previously described input signals to computer 100. Referring still to FIG. 3 computer 100 is shown as a solid line around the logic blocks. Signal 30 which is representative of the actual temperature of the liquid at the selected tray 28 in distillation column 10 is provided as an input to delay block 102 and is further provided as an input to calculate correction block 104. In delay block 102 signal 30 is delayed for a period of time substantially equal to the total latency of analyzer 32, i.e. transport lag plus analysis time. The output of delay block 102 is provided as an input to a sample and hold block 103. Sample and hold block 103 is also provided with an analysis completion signal 37, which is representative of the completion of a new analysis in analyzer 32. Signal 37 causes the value of the sample and hold signal 105 to remain constant at the delayed temperature corresponding to the completion of the analysis, until the next analysis is completed.

Sample analysis signal 36 is also provided as input to calculate correction block 104. As previously noted signal 36 is true for a single analysis and is updated for each sample analyzed by analyzer 32. Signal 108 is representative of the value of the constant "b" used in equation (1) and can be changed for different separations carried out in distillation column 10. A value of 0.21 for the constant "b" was determined from a plurality of computer simulation runs and was found to be satisfactory for composition control of the upper portion of a commercial depropanizer column. In response to the above-described inputs the correction $\Delta X$ to be applied to analysis signal 36 is calculated in computer block 104. Symbols used in computer block 104 are defined as follows:

X=signal 36,
T=signal 30,
$T_d$=signal 105,
b=signal 108, and
$\Delta X$=signal 110

Signal 110, which is the correction signal, is representative of the output $\Delta X$ of calculate correction box 104 and is provided to a filter 112. Filters 112 and 120 will generally be digital low pass filters having a single pole and will be implemented in a software subroutine as is well known in the art. A time constant of about 25 minutes for filter 112 and a time constant of about 4 minutes for filter 120 was found to be effective for composition control of the upper portion of a commercial depropanizer column. Signal 114 which is representative of the output of filter 112 is presented as a first input to summation block 116, and signal 36 is presented as a second input to summation block 116. Signal 118, which is the corrected sample analysis signal, is representative of the summation of signals 36 and 114 and is provided from summation block 116 as an input to filter block 120. Signal 52 is a filtered output signal of computer 100 which is utilized for process control. Signal 52 is provided from computer 100 as a process variable signal input to analyzer recorder controller 54.

Summary the total dead time associated with a chromatograph analyzer in a composition control system for a distillation column is essentially eliminated by inferring a correction for the analysis from a temperature difference measurement of the liquid on a selected tray. The correction inferentially updates the analysis such that the inferentially updated analysis accurately represent the concentration vs. time behavior of the distillation column. The invention is applicable to controlling the concentration of any product of a distillation column suitable for chromatograph analysis.

The invention has been described in terms of a preferred embodiment as illustrated in FIGS. 1, 2 and 3. Specific components as used in the practice of the invention as illustrated in FIG. 1 such as a chromatograph, process measurement transducers, controllers and valves are well known commercially available control components such as are described at length in Perry's Chemical Engineering Handbook, 5th Edition. Chapter 22 of McGraw & Hill. A digital computer is also used in the preferred embodiment of this invention to calculate the required correction based on measured process variables presented to the computer. Any digital computer having software that allows operation in a real time environment, for reading values of external variables and transmitting signals, is suitable for use in this invention. Signal lines are also utilized to represent the results of calculations carried out in a digital computer, and the term "signal" is used herein to refer to such results. Thus, the term signal is used not only to refer to electrical currents or pneumatic pressures, but also is used herein to refer to binary representations of calculated or measured values.

While the invention has been described in terms of the presently preferred embodiment, reasonable variations and modifications are possible by those skilled in the art and such variations and modifications are within the scope of the described invention and the appended claims.

That which is claimed is:

1. A method of correcting a sample analysis signal comprising:
   (a) analyzing said sample using an analyzer which periodically samples and then analyzes fluid in a distillation column, wherein said analyzer provides said sample analysis signal representative of the concentration of at least one component in said sample, and further wherein said sample analysis signal is true for said sample and said analyzer retains a value for a time interval between samples until a following sample is analyzed;
   (b) determining a change in temperature of a liquid on a selected tray in said distillation column wherein said change in temperature in determined from a current and a delayed temperature measurement of the liquid of said selected tray;
   (c) determining a correction signal for said sample analysis signal responsive to said temperature change determination in step (b), wherein said correction signal is calculated with the formula:

$$\Delta X = X(e^{b\Delta T} - 1)$$

where:
   X is the concentration of said at least one component resulting from the last completed analysis, in mol fraction,
   $\Delta T = T - T_d$, in °K.,
   T is the current temperature of liquid on the selected tray, in °K.
   $T_d$ is the delayed temperature at the completion of an analyses, in
   b is a constant dependent on the separation carried out in said column; and
   (d) adding said correction signal determined in step (c) to said sample analysis signal so as to provide a corrected sample analysis signal.

2. A method in accordance with claim 1 wherein a time delay for said delayed temperature is substantially equal to a total time delay of said analyzer.

3. A method in accordance with claim 1 wherein a computer is used for determining said correction signal and wherein said step of determining a change in temperature comprises:

(a) establishing a first signal representative of the actual temperature of the liquid at the selected tray of said distillation column, and providing said first signal to said computer;

(b) providing a time delay for said first signal so as to establish a second signal which is representative of a delayed temperature, wherein said time delay for said first signal is substantially equal to the total delay of said analyzer;

(c) sampling said second signal when a new analysis is completed in said analyzer, so as to establish a third signal, and holding said third signal constant until completion of the next analysis; and (d) subtracting said third signal from said first signal to determine said change in temperature.

4. A method in accordance with claim 3 wherein said analyzer is a gas chromatograph and the time interval between samples analyzed is in a range of about three minutes to about thirty minutes.

5. A method in accordance with claim 1 additionally comprising:

filtering said correction signal prior to adding said correction signal to said sample analysis signal; and filtering said corrected sample analysis signal to provide a process variable signal.

6. In a method for controlling composition in a distillation column with the aid of a computer, wherein a distillation analyzer measures composition of a key component in an overhead stream which is withdrawn from said column and at least part of said overhead stream is returned to said distillation column as an external liquid reflux stream, and said reflux stream is manipulated for controlling the composition of said overhead stream, and wherein said distillation analyzer periodically samples and then analyzes fluid in said overhead stream and provides a sample analysis signal which is true for a sample, and then retains that value until a following sample is analyzed, the improvement comprising inferring a value for correcting the analysis provided by said analyzer from a temperature measurement by:

a. determining a change in temperature of a liquid on a selected tray in said distillation column wherein said change in temperature is determined from a current and a delayed temperature measurement of the liquid on said selected tray;

b. determining a correction signal for said sample analysis signal responsive to the determination in step (a) wherein said correction signal is calculated with the formula:

$$\Delta X = X(e^{b\Delta T} - 1)$$

where:

X is the concentration of said key component resulting from a last completed analysis in mol fraction, $\Delta T = T - T_d$, in °K., and T is the current temperature of liquid on the selected tray, in °K.

$T_d$ is the delayed temperature at the completion of an analysis b is a constant dependent on the separation carried out in said column;

c. filtering said correction signal;

d. adding the filtered correction signal determined in step c to said sample analysis signal to provide a correction sample analysis signal;

e. filtering said corrected sample analysis signal to provide a process variable signal;

f. providing said process variable signal as an input to an analyzer controller operatively connected to manipulate flow rate of said external reflux; and g. manipulating flow rate of said external reflux responsive to said updated analysis signal so as to maintain a desired concentration of said key component in said overhead stream.

7. A method in accordance with claim 6 wherein said step of determining a change in temperature comprises:

(a) establishing a first signal representative of the actual temperature of the liquid at the selected tray of said distillation column, and providing said first signal to said computer;

(b) providing a time delay for said first signal so as to establish a second signal which is representative of a delayed temperature, wherein said time delay for said first signal is substantially equal to the total delay of said analyzer;

(c) sampling said second signal when a new analysis is completed in said analyzer so as to establish a third signal, and holding said third signal constant until completion of the next analysis; and (d) subtracting said third signal from said first signal to determine said change in temperature.

8. A method in accordance with claim 6 wherein said selected tray is chosen with the aid of a steady state computer simulation of the separation made in said distillation column wherein said steady state simulation provides a temperature profile for said column corresponding to a change in product flow so as to select a tray reflecting maximum temperature sensitivity to product flow in said distillation column.

9. A method in accordance with claim 8 wherein said analyzer is a gas chromatograph and the time interval between samples analyzed is in a range of about three minutes to about six minutes.

10. A method in accordance with claim 8 additionally including the step of determining a value of the constant b with the aid of a plurality of said steady state computer simulation runs.

11. Apparatus for controlling composition in a distillation column with the aid of a computer, wherein a distillation analyzer measures composition of a key component in an overhead stream which is withdrawn from said column and at least part of said overhead stream is returned to said distillation column as an external liquid reflux stream, and said reflux stream is manipulated for controlling the composition of said overhead stream, and wherein said distillation analyzer periodically samples and then analyzes fluid in said overhead stream and provides a sample analysis signal which is true for a sample, and then retains that value until a following sample is analyzed, the improvement comprising apparatus for inferring a value for correcting the analysis provided by said analyzer from a temperature measurement, said apparatus comprising:

a. means for determining a change in temperature of a liquid on a selected tray in said distillation column wherein said change in temperature is determined from a current and a delayed temperature measurement of the liquid on said selected tray;

b. means for determining a correction signal for said sample analysis signal responsive to the determination in step (a) wherein said correction signal is calculated with the formula:

$$\Delta X = X(e^{b\Delta T} - 1)$$

where:
X is the concentration of said key component resulting from the last completed analysis, in mol fraction,
$\Delta T = T - T_d$, in °K., and
T is the current temperature of liquid on the selected tray, in °K.
$T_d$ is the delayed temperature at the completion of an analysis
b is a constant dependent on the separation carried out in said column;

c. means for filtering said correction signal;
d. means for adding the filtered correction signal determined in step (b) to said sample analysis signal to provide a corrected sample analysis signal;
e. means for filtering said corrected sample analysis signal to provide a process variable signal;
f. means for providing said process variable signal as an input to an analyzer controller operatively connected to manipulate flow rate of said external reflux; and
g. means for manipulating flow rate of said external reflux responsive to said updated analysis signal so as to maintain a desired concentration of said key component in said overhead stream.

12. Apparatus in accordance with claim 11 wherein said means for filtering said correction signal is a single pole filter having a time constant of about 25 minutes and said means for filtering said corrected sample analysis signal is a single pole filter having a time constant of about 4 minutes.

13. Apparatus in accordance with claim 11 wherein said means for determining a change in temperature comprises:
(a) means for establishing a first signal representative of the actual temperature of the liquid at the selected tray of said distillation column, and providing said first signal to said computer;
(b) means for providing a time delay for said first signal so as to establish a second signal which is representative of a delayed temperature, wherein said time delay is substantially equal to the total delay of said analyzer;
(c) means for sampling said second signal when an analysis is completed in said analyzer so as to establish a third signal, and holding said third signal constant until completion of the next analysis; and
(d) means for subtracting said third signal from said first signal to determine said change in temperature.

14. Apparatus in accordance with claim 13 wherein said analyzer is a chromatograph analyzer, and the time interval between samples analyzed is in a range of about three minutes to about thirty minutes.

15. Apparatus in accordance with claim 14 additionally including an off-line computer programmed for selecting a tray reflecting maximum temperature sensitivity to product flow in said distillation column by simulating the separation carried out in said distillation column and providing a plot showing a temperature profile of said distillation column for changes in product flow.

* * * * *